(12) United States Patent     (10) Patent No.:   US 12,636,137 B2

Benning     (45) Date of Patent:     May 26, 2026

(54) TOOTHBRUSH WITH TAPPING MOTION

(71) Applicant: KONINKLIJKE PHILIPS N.V.,
Eindhoven (NL)

(72) Inventor: Wolter Benning, Seattle, WA (US)

(73) Assignee: KONINKLIJKE PHILIPS N.V.,
Eindhoven (NL)

( * ) Notice: Subject to any disclaimer, the term of this
patent is extended or adjusted under 35
U.S.C. 154(b) by 293 days.

(21) Appl. No.: 18/266,860

(22) PCT Filed: Dec. 14, 2021

(86) PCT No.: PCT/EP2021/085777
§ 371 (c)(1),
(2) Date: Jun. 13, 2023

(87) PCT Pub. No.: WO2022/129103
PCT Pub. Date: Jun. 23, 2022

(65) Prior Publication Data
US 2024/0050215 A1     Feb. 15, 2024

Related U.S. Application Data

(60) Provisional application No. 63/126,385, filed on Dec.
16, 2020.

(51) Int. Cl.
*A61C 17/34*     (2006.01)
*A61C 17/22*     (2006.01)
*A46B 13/02*     (2006.01)

(52) U.S. Cl.
CPC ........ *A61C 17/3463* (2013.01); *A61C 17/224*
(2013.01); *A46B 13/02* (2013.01); *A61C
2204/002* (2013.01)

(58) Field of Classification Search
CPC . A61C 17/3472; A61C 17/3463; A61C 17/22;
A61C 17/32; A46B 13/02
See application file for complete search history.

(56) References Cited

U.S. PATENT DOCUMENTS

| | | |
|---|---|---|
| 5,378,153 A | 1/1995 | Giuliani et al. |
| 8,418,300 B2 | 4/2013 | Miller et al. |
| (Continued) | | |

FOREIGN PATENT DOCUMENTS

| | | |
|---|---|---|
| JP | 2001198145 A | 7/2001 |
| WO | 9210979 A1 | 7/1992 |
| (Continued) | | |

OTHER PUBLICATIONS

International Search Report and Written Opinion Dated Apr. 5, 2022
For International Application No. PCT/EP2021/085777 Filed Dec.
14, 2021.

*Primary Examiner* — Michael D Jennings

(57) ABSTRACT

The present disclosure is directed to a low-cost toothbrush
with a simple-to-manufacture design that provides a tapping
motion of the brush head. In an embodiment, a dental
cleaning device includes an eccentric rotating mass motor
and a drive shaft mechanically coupled to the motor. A
spring element is mounted to the drive shaft in a configu-
ration in which it acts in a direction perpendicular to the axis
of the drive shaft. The spring element and drive shaft form
an assembly having a resonant frequency. A power source
supplies to the motor power sufficient to cause the motor to
operate near the resonant frequency of the assembly.

16 Claims, 1 Drawing Sheet

(56)          References Cited

U.S. PATENT DOCUMENTS

| | | | | |
|---|---|---|---|---|
| 8,875,335 | B2 * | 11/2014 | Kloster ............. | A61C 17/3418 |
| | | | | 15/22.1 |
| 9,744,012 | B2 | 8/2017 | Sayles et al. | |
| 11,351,836 | B2 | 6/2022 | Schlotter et al. | |
| 2003/0162146 | A1 * | 8/2003 | Shortt .................. | A61C 17/221 |
| | | | | 433/118 |
| 2005/0177962 | A1 | 8/2005 | Chan | |
| 2006/0255665 | A1 | 11/2006 | Kraus et al. | |
| 2011/0156325 | A1 | 6/2011 | Cansiz | |
| 2012/0246845 | A1 * | 10/2012 | Kloster .................. | A61C 17/32 |
| | | | | 15/22.1 |
| 2015/0150664 | A1 | 6/2015 | Crossman et al. | |
| 2017/0100223 | A1 * | 4/2017 | Silverberg ........... | A61C 17/228 |
| 2019/0175322 | A1 * | 6/2019 | Bloch .................... | A61C 17/34 |
| 2020/0214816 | A1 * | 7/2020 | Bloch ............... | A61C 17/3481 |

FOREIGN PATENT DOCUMENTS

| | | | | | |
|---|---|---|---|---|---|
| WO | WO-2006006808 | A1 * | 1/2006 | ............. | A61C 17/26 |
| WO | 2006109077 | A1 | 10/2006 | | |
| WO | WO-2011077287 | A1 * | 6/2011 | ............. | A61C 17/32 |

* cited by examiner

TOOTHBRUSH WITH TAPPING MOTION

This application is the U.S. National Phase application under 35 U.S.C. § 371 of International Application No. PCT/EP2021/085777, filed on Dec. 14, 2021, which claims the benefit of U.S. Application Ser. No. 63/126,385, filed Dec. 16, 2020. These applications are hereby incorporated by reference herein.

FIELD OF THE INVENTION

The invention is related to the field of devices for oral care and more particularly, to power toothbrushes.

BACKGROUND

Power toothbrushes typically provide either a sweeping motion of the brush head, in which the brush head rotates about its longitudinal axis, or a rotary motion, where bristle tufts arranged in a circular pattern rotate about an axis perpendicular to the toothbrush's longitudinal axis. Low cost power toothbrushes with brush heads moving in a sweeping motion typically use an eccentric rotary mass (ERM) motor to obtain a sweeping brush head motion.

Low cost power toothbrushes often exhibit a generally uncontrolled orbital sweeping motion which lacks efficacy. They also produce considerable handle and brush vibrations, which can be uncomfortable for the user. There are more efficient toothbrushes that produce good efficacy using a magnetic coil to drive a mechanical resonator and the brush motion. Such a system can be complex, requiring tuning and electronics such processers and MOSFETs to create the optimal AC signal to drive the coil. This results in higher manufacturing costs.

U.S. Pat. No. 8,418,300, which is hereby incorporated by reference, describes a power toothbrush system that can be manufactured at low cost using an electric motor, with a resonance-seeking characteristic. In an embodiment described in this patent, as the RPM of the motor increases from zero following start-up, the drive signal frequency increases to a point near resonance, where the energy from the drive signal is transferred into the rotating motion of the driven assembly, producing an effective amplitude of a brush head sweeping motion.

SUMMARY

A toothbrush which moves its brush head exclusively in a direction parallel to the bristle direction may provide good cleaning efficacy. This motion (which will be called "tapping" in the discussion below) heretofore has not been available in a low-cost electric toothbrush. According to aspects and embodiments described herein addressing such a need, the present disclosure is directed to a low-cost toothbrush with a simple-to-manufacture design that provides a tapping motion of the brush head.

In an embodiment, a dental cleaning device includes a rotary motor with an eccentric mass and a driven member mechanically coupled to the motor. In an embodiment, the motor is an eccentric rotating mass motor. A spring element is mounted to the driven member in a configuration in which it acts in a direction perpendicular to the axis of the driven member. The spring element and driven member form an assembly having a resonant frequency. A power source supplies to the motor power sufficient to cause the motor to operate near the resonant frequency of the assembly.

In an embodiment, the device also includes a frame though which the driven member extends, the driven member is a drive shaft coupled to the motor, and the spring element is a torsion spring mounted between the drive shaft and the frame in an orientation where it applies a force to the drive shaft in a direction perpendicular to the axis of the motor.

In an embodiment, the driven member includes a drive shaft and a brush head coupled to the drive shaft, the brush head having bristles oriented in a direction parallel to the direction of the force exerted by the spring element.

In an embodiment, when the motor is operating, the brush head moves in a predominantly tapping motion. While the motor is operating near the resonant frequency of the assembly, the brush head moves in a predominantly tapping motion.

In the embodiments, the power supply may be a DC power supply. The DC power supply may be a battery, and the battery may be rechargeable or replaceable.

In an embodiment, the spring element may include a pair of torsion springs positioned on opposing sides of the driven member.

In the embodiments, the spring element may include a plastic element. The spring element may be a helical spring, a torsion bar or a leaf spring.

In an embodiment, a power toothbrush includes a frame; an eccentric mass rotary motor mounted on the frame; and a drive shaft mechanically coupled to the motor. A torsion spring is mounted to the drive shaft and to the frame in a configuration where it applies a force to the drive shaft in a direction perpendicular to the axis of the drive shaft. The torsion spring, drive shaft and frame form an assembly having a resonant frequency. A brush head is mounted on the drive shaft in an orientation in which the bristles on the brush head are parallel to the direction of force exerted by the torsion spring. A battery supplies DC power to the motor power sufficient to cause the motor to operate near the resonant frequency of the assembly. In this embodiment, while the motor is operating near the resonant frequency, the brush head moves in a substantially tapping motion.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the inventive subject matter.

DETAILED DESCRIPTION

The disclosed subject matter will become better understood through review of the following detailed description in conjunction with the figures. The detailed description and figures provide example embodiments of the invention described herein. Those skilled in the art will understand that the disclosed examples may be varied, modified, and altered without departing from the scope of the invention described herein.

Figures 2, 3:
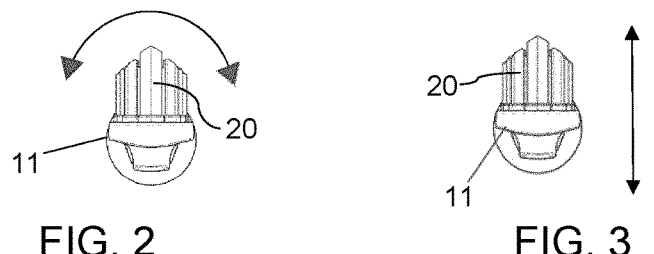
FIG. 2 is an end view of a brush head on a power toothbrush with arrows to indicate movement direction.
FIG. 3 is an end view of a brush head on a power toothbrush with arrows to indicate movement direction according to an embodiment of the invention.
Figure 1:
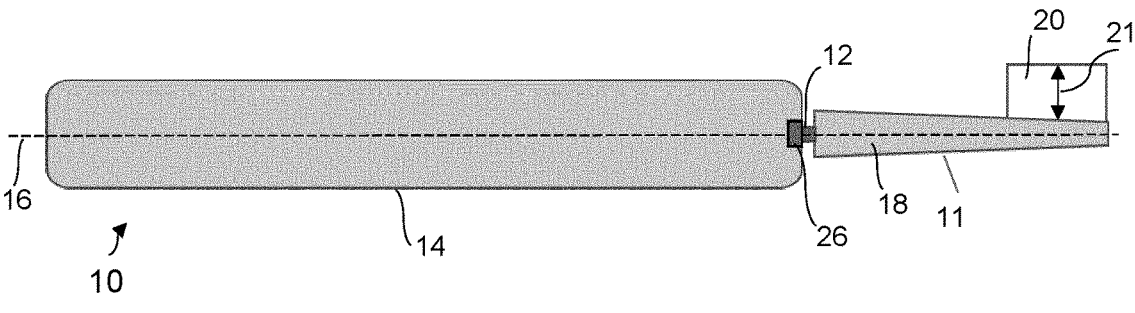
FIG. 1 is an illustration of a side view of a power toothbrush according to an embodiment of the invention.

Referring to FIGS. 1, 2 and 3, a power toothbrush 10 has a brush head 11 mounted to a drive shaft 12 which extends outward from a housing 14. The housing 14 is of a size and form that serves as a handle for a user. The brush head 11 may be replaceable. The toothbrush 10 has a longitudinal axis 16 through the drive shaft 12 and neck 18 of the brush head 11. In a conventional power toothbrush, the drive shaft 12 rotates about the longitudinal axis 16. This, in turn rotates the brush head 11 through an arc generally indicated by the arrows in FIG. 2. This arc is perpendicular to the longitudinal axis 16. Rotational movement through an arc perpendicular to the longitudinal axis of a power toothbrush is referred to herein as a sweeping motion. Referring to FIG. 3, the embodiments described herein will provide a brush head motion in a generally up-and-down direction indicated by the two-headed arrow in FIG. 3. This direction is generally perpendicular to the longitudinal axis 16 of the drive shaft 12, and parallel to the length of the bristles 20 (see double-headed arrow 21 in FIG. 1). Brush head motion in a direction generally perpendicular to the longitudinal axis and parallel to the length of the bristles is referred to herein as a tapping motion.

While conventional power toothbrushes provide a predominantly sweeping motion, it has been recognized that a predominantly tapping motion can be efficacious in cleaning teeth. A power toothbrush that provides this motion would be an effective alternative to the sweeping motion of commonly available power toothbrushes, and in some cases, may be more effective than a conventional sweeping movement. The embodiments described herein provide a power toothbrush with an effective alternative cleaning mechanism, i.e. a brush head moving predominantly in a tapping motion, which can be easily manufactured at relatively low cost.

Figure 4:
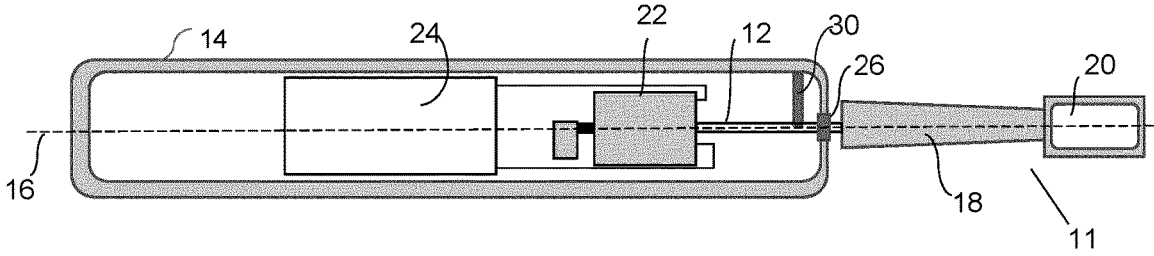
FIG. 4 is a schematic illustration of a top view of a power toothbrush according to an embodiment described herein.

Referring to FIG. 4, in the illustrated embodiment an eccentric rotating mass motor (ERM) 22 is mounted to the interior of the housing 14. ERM motors which have a size and form that fits within a housing 14 used as a toothbrush handle are commercially available. A DC power source 24 which provides a constant voltage to the motor 22 is connected to the ERM motor 22. The power source 24 may be a battery that is replaceable or rechargeable. The battery 24 may be one which provides a battery voltage of about 1 to 3 volts, matching the specified operating voltage for the ERM motor 22. If it is desired to vary the performance of the toothbrush to provided different performance levels to the user, or to accommodate voltage degradation as the battery discharges, the effective voltage can be changed through pulse width modulation.

Drive shaft 12 is mechanically coupled to the motor 22, and extends outward from the housing 14 to engage with the brush head 11. The ERM motor 22 provides a reciprocating force which is transferred via the drive shaft 12 to the brush head 11. An example of a coupling mechanism between a drive shaft and a brush head which is capable of transferring such a force can be found in U.S. Pat. No. 8,782,841, which is incorporated herein by reference. A seal 26, which may be, for example, a rubber seal, is on the end of the housing 14 to seal the opening where the drive shaft 12 exits the housing 14, to prevent the egress of water or other fluids into the housing 14.

A torsion spring 30 is mounted to the interior of the housing 14 and to the drive shaft 12 in a configuration where the torsion spring 30 acts on the drive shaft 12 in a direction perpendicular to the drive shaft's axis 16 and parallel to the length of the bristles 20 on the brush head 11. In the illustrated embodiment, the housing 14 acts as a frame which is substantially stationary relative to the drive shaft axis 16. In other embodiments, a separate frame which is stationary relative to the drive shaft 12 may be contained within the housing 14, and in such an alternative embodiment, the torsion spring 30 would be mounted to the frame and the drive shaft 12. A pair of torsion springs may be used, mounted on opposing sides of the drive shaft.

The torsion spring 30 may be metal or a plastic material. Low-cost plastics such as polyoxymethylene (POM) or a polyamide may be used. It may be formed as a torsion bar, a helical spring, a leaf spring, or a combination of leaf springs, a V-shaped leaf spring, or a spiral spring.

In an embodiment, the drive shaft 12, torsion spring 30 and housing/frame 14 may be fabricated as a unitary piece from a plastic material (such as, for example, POM or PA), or may be separate pieces of metal or plastic which are assembled together.

In operation, the ERM motor 22 imparts a reciprocating motion to the drive shaft 12, which transmits it to the brush head. The spring element 30, acting in a direction perpendicular to the drive shaft axis 16 and parallel to the direction in which the bristles 20 extend, will urge the drive shaft 12 and brush head 11 into a translational movement and provide the stiffness needed to inhibit orbital movement. With the brush head 11 and spring element 30 positioned in orientations where the direction of the bristles 20 is parallel to the force exerted by the spring 30, this results in a predominantly tapping motion of the brush head 11. To minimize motion at the seal 26, the torsion spring 30 of the illustrated embodiment is positioned near the seal 26.

The motor, drive shaft 12, brush head 11 and spring 30 combined form a mechanical resonant system. After powering on the motor 22, its frequency will increase. As it nears the resonant frequency of the resonant system, the motor frequency will stabilize, and it will establish an equilibrium between the energy output of the motor 22 and the energy absorbed by the resonant system. At this point, the brush head 11 will move in a tapping motion with substantial amplitude, because the resonant system is absorbing the bulk of the energy from the motor 22, and the torsion spring 30 is applying a force that results in a predominantly tapping motion of the brush head 11. The voltage of the DC signal from the power source 24 will control to that point of stability, with a higher voltage nearing closer (or beyond) the resonant frequency. Reference is made to U.S. Pat. No. 8,418,300, owned by assignee of the present invention, which describes a power toothbrush with a resonance-seeking characteristic. In an embodiment described in this patent, as the RPM of the motor increases from zero following start-up, the drive signal frequency increases to a point near resonance, where the energy from the drive signal is transferred into the rotating motion of the driven assembly, producing an effective amplitude of a brush head sweeping motion.

Changes to the resonant system will change its resonance characteristics, and therefore, the amount of energy it can absorb. For a given toothbrush, its resonance characteristics can change over time by, for example, a spring element gradually losing its stiffness over time or the effect of wear on other parts of the system. Resonance characteristics will also vary from one toothbrush to the next due to manufacturing tolerances. Also, aspects of how a user interacts with the toothbrush (for example, how tightly it is gripped or applied to the teeth) may affect the resonant system. Because the motor 22 output of the embodiment increases until is near the resonant frequency of the resonant system rather than increasing to a preset frequency, it does not require manufacturing tuning or adjustment to operate at optimal performance. Also because of this, relatively low cost materials and relatively large manufacturing tolerances can be used. The spring element 30 can be formed of a low cost plastic such as POM or PA, since the system will self-adjust to gradual stiffness changes over time. The drive shaft, housing and spring can be fabricated as a single plastic part, made of a common plastic such as POM or PA, with the resonance-seeking characteristic of the embodiment accommodating any stiffness changes over life of the product. In such an embodiment, the plastic construction can also provide for a motor attachment (clamping or adhesive) and housing interface.

In the illustrated embodiment, overshoot may be avoided. If, as a result of a change or variance in resonance characteristics, the system could not absorb the energy output of the motor 22, the motor frequency would rise above the resonant frequency of the resonant system. This is called "overshoot". If overshoot were to occur, the motor frequency would continue to rise and would not decrease to the resonant frequency. This would have undesirable consequences, such as uncomfortable vibration of the toothbrush in the user's hand, increased wear-and-tear on the components of the toothbrush, and a brush head motion that would be inefficient to the point of being ineffective In an embodiment, the drive shaft 12 has a characteristic such that it acts as a compliant element between the motor 22 and the brush head 11 and absorbs some of the motor output. This keeps the operating frequency of the motor 22 below the system resonant frequency, thus avoiding overshoot. The compliant element can, alternatively, be an additional part.

While the invention has been illustrated and described in detail in the drawings and foregoing description, such illustration and description are to be considered illustrative or exemplary and not restrictive; the invention is not limited to the disclosed embodiments. Variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference numbers in the claims should not be construed as limiting the scope of the claims.

All definitions, as defined and used herein, should be understood to control over dictionary definitions, definitions in documents incorporated by reference, and/or ordinary meanings of the defined terms.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described or depicted herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

The invention claimed is:

1. A dental cleaning device comprising:
a housing;
a rotary motor with an eccentric mass, the rotary motor being mounted to the interior of the housing;
a driven member mechanically coupled to the motor and having an end extending outward from the housing which is configured to be coupled to a brush head having bristles and;
a spring element mounted to the interior of the housing and to the driven member in a configuration in which the spring element acts in a direction perpendicular to the axis of the driven member and parallel to the direction of the bristles;
the motor, spring element and driven member forming an assembly having a resonant frequency;
a power source supplying to the motor power sufficient to cause the motor to operate near the resonant frequency of the assembly, wherein while operating at the resonant frequency the driven member moves predominantly in a tapping motion.

2. The device of claim 1 further comprising a frame though which the driven member extends, and wherein
the driven member comprises a drive shaft coupled to the motor, and
the spring element comprises a torsion spring mounted between the drive shaft and the frame in an orientation where it applies a force to the drive shaft in a direction perpendicular to the axis of the motor.

3. The device of claim 2 wherein the motor comprises an eccentric rotating mass motor.

4. The device of claim 2, further comprising the brush head coupled to the drive shaft, the brush head having bristles oriented in a direction parallel to the direction of the force exerted by the spring element.

5. The device of claim 4 wherein, when the motor is operating, the brush head moves in a predominantly tapping motion.

6. The device of claim 4 wherein while the motor is operating near the resonant frequency of the assembly, the brush head moves in a predominantly tapping motion.

7. The device of claim 4, wherein the driven member comprises a drive shaft that acts as a compliant element between the motor and the brush head which keeps the operating frequency of the motor below the system resonant frequency.

8. The device of claim 2 wherein the spring element includes a pair of torsion springs positioned on opposing sides of the drive shaft.

9. The device of claim 2 wherein the spring element comprises a helical spring.

10. The device of claim 2 wherein the spring element comprises a leaf spring.

11. The device of claim 1 wherein the power supply is a DC power supply.

12. The device of claim 11 wherein the DC power supply comprises a battery.

13. The device of claim 12 wherein the battery is a rechargeable battery.

14. The device of claim 12 wherein the battery is a replaceable battery.

15. The device of claim 1 wherein the spring element includes a plastic element.

16. A power toothbrush comprising:

a frame;

an eccentric mass rotary motor mounted on the frame;

a drive shaft mechanically coupled to the motor at a first end;

a torsion spring mounted to the drive shaft and to the frame in and adapted to apply a force to the drive shaft in a direction perpendicular to the axis of the drive shaft;

the torsion spring, motor, drive shaft and frame forming an assembly having a resonant frequency;

a brush head mounted on a second end of the drive shaft in an orientation in which the bristles on the brush head are parallel to the direction of the force exerted by the torsion spring;

a battery supplying DC power to the motor power suffi- cient to cause the motor to operate near the resonant frequency of the assembly, wherein while the motor is operating near the resonant frequency, the brush head moves in a substantially tapping motion.

* * * * *